(12) United States Patent
Shiiba et al.

(10) Patent No.: US 7,400,964 B2
(45) Date of Patent: Jul. 15, 2008

(54) DECELERATION CONTROL APPARATUS AND METHOD FOR A VEHICLE

(75) Inventors: Kazuyuki Shiiba, Susono (JP); Kunihiro Iwatsuki, Toyota (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 637 days.

(21) Appl. No.: 10/998,558

(22) Filed: Nov. 30, 2004

(65) Prior Publication Data

US 2005/0125137 A1  Jun. 9, 2005

(30) Foreign Application Priority Data

Dec. 5, 2003 (JP) ............................. 2003-407780

(51) Int. Cl.
*B60T 7/12* (2006.01)

(52) U.S. Cl. ............................. 701/96; 701/70; 701/79; 701/90; 303/152; 477/40; 340/903

(58) Field of Classification Search ................. 701/65, 701/70, 79, 80, 87, 90, 96; 303/152; 477/40; 340/903
See application file for complete search history.

(56) References Cited

U.S. PATENT DOCUMENTS

| 5,085,104 | A | * | 2/1992 | Kouno et al. ................. 477/40 |
| 5,113,718 | A | | 5/1992 | Sato |
| 5,420,792 | A | | 5/1995 | Butsuen et al. |
| 5,731,977 | A | | 3/1998 | Taniguchi et al. |
| 5,748,476 | A | | 5/1998 | Sekine et al. |
| 6,126,251 | A | | 10/2000 | Yoshii et al. |
| 6,161,073 | A | | 12/2000 | Tange et al. |
| 6,182,000 | B1 | | 1/2001 | Ohta et al. |
| 6,188,316 | B1 | | 2/2001 | Matsuno et al. |
| 6,199,001 | B1 | | 3/2001 | Ohta et al. |
| 6,208,927 | B1 | | 3/2001 | Mine et al. |

(Continued)

FOREIGN PATENT DOCUMENTS

DE   19621085   11/1996

(Continued)

OTHER PUBLICATIONS

U.S. Appl. No. 11/491,039, filed Jul. 24, 2006, Shiiba et al.

(Continued)

*Primary Examiner*—Gertrude Arthur Jeangla
(74) *Attorney, Agent, or Firm*—Oblon, Spivak, McClelland, Maier & Neustadt, P.C.

(57) ABSTRACT

In a deceleration control method for a vehicle, by which deceleration control of the vehicle is performed based on a distance between the vehicle had an obstacle including a preceding vehicle ahead of the vehicle, a target deceleration at which the vehicle is to be decelerated is obtained based on the distance; a speed or speed ratio that will apply a deceleration equal to, or less than, the target deceleration to the vehicle is selected as the speed or speed ratio of a transmission of the vehicle during a shift operation; and the deceleration control is executed by an operation of a brake system which applies a braking force to the vehicle and a shift operation which shifts the transmission of the vehicle into a relatively low speed or speed ratio.

24 Claims, 11 Drawing Sheets

U.S. PATENT DOCUMENTS

| | | |
|---|---|---|
| 6,216,082 B1 | 4/2001 | Minowa et al. |
| 6,223,118 B1 | 4/2001 | Kobayashi et al. |
| 6,287,237 B1 | 9/2001 | Graf et al. |
| 6,353,787 B2 | 3/2002 | Nishiyama |
| 6,405,116 B1 | 6/2002 | Koibuchi |
| 6,868,324 B2 | 3/2005 | Matsumoto et al. |
| 2001/0004028 A1 | 6/2001 | Sato et al. |
| 2002/0026276 A1 | 2/2002 | Hattori et al. |
| 2005/0125137 A1 | 6/2005 | Shiiba et al. |

FOREIGN PATENT DOCUMENTS

| | | |
|---|---|---|
| DE | 198 07 095 A1 | 8/1999 |
| DE | 19922242 | 12/1999 |
| DE | EP1044843 | 10/2000 |
| DE | 100 39 920 A 1 | 3/2001 |
| DE | 101 41 919 A 1 | 3/2002 |
| DE | 102 16 546 A1 | 10/2002 |
| EP | 0 729 860 A2 | 9/1996 |
| EP | 1 197 684 A1 | 4/2002 |
| JP | 64-30848 | 2/1989 |
| JP | 2-296062 | 12/1990 |
| JP | 05240075 A | 9/1993 |
| JP | 6-199156 | 7/1994 |
| JP | 7-1995 | 1/1995 |
| JP | 7-251724 | 10/1995 |
| JP | 7-306998 | 11/1995 |
| JP | 8-85362 | 4/1996 |
| JP | 8-85373 | 4/1996 |
| JP | 2503426 | 4/1996 |
| JP | 8-147598 | 6/1996 |
| JP | 8-150914 | 6/1996 |
| JP | 8-192659 | 7/1996 |
| JP | 8-301084 A | 11/1996 |
| JP | 9-242863 | 9/1997 |
| JP | 10-184877 | 7/1998 |
| JP | 10-185603 | 7/1998 |
| JP | 10-203203 | 8/1998 |
| JP | 10-236290 | 9/1998 |
| JP | 10-264788 | 10/1998 |
| JP | 10-264791 | 10/1998 |
| JP | 10-324175 | 12/1998 |
| JP | 11-63211 | 3/1999 |
| JP | 11-115545 | 4/1999 |
| JP | 11-278096 | 10/1999 |
| JP | 2000-39062 | 2/2000 |
| JP | 2000-43696 | 2/2000 |
| JP | 2000-127803 | 5/2000 |
| JP | 2000-168521 | 6/2000 |
| JP | 2000-233730 | 8/2000 |
| JP | 2000-245016 | 9/2000 |
| JP | 3123384 | 10/2000 |
| JP | 2000-318484 | 11/2000 |
| JP | 2001-26228 | 1/2001 |
| JP | 2001-27317 | 1/2001 |
| JP | 2001-30791 | 2/2001 |
| JP | 2001-30792 | 2/2001 |
| JP | 2001-90831 | 4/2001 |
| JP | 2001341546 A | 12/2001 |
| JP | 2002-217028 | 8/2002 |
| JP | 2003-54395 | 2/2003 |
| JP | 2003-99897 | 4/2003 |
| JP | 2003-118425 | 4/2003 |
| JP | 2003-237420 | 8/2003 |
| JP | 2003-256999 | 9/2003 |
| KR | 1997-0044795 | 7/1997 |
| KR | 1998-046906 | 9/1998 |

OTHER PUBLICATIONS

U.S. Appl. No. 11/338,693, filed Jan. 25, 2006, Shiiba et al.
U.S. Appl. No. 10/998,558, filed Nov. 30, 2004, Shiiba et al.
U.S. Appl. No. 11/081,584, filed Mar. 17, 2005, Iwatsuki et al.
U.S. Appl. No. 10/998,958, filed Nov. 30, 2004, Iwatsuki et al.
U.S. Appl. No. 10/998,562, filed Nov. 30, 2004, Shiiba et al.
U.S. Appl. No. 10/999,136, filed Nov. 30, 2004, Iwatsuki et al.

* cited by examiner

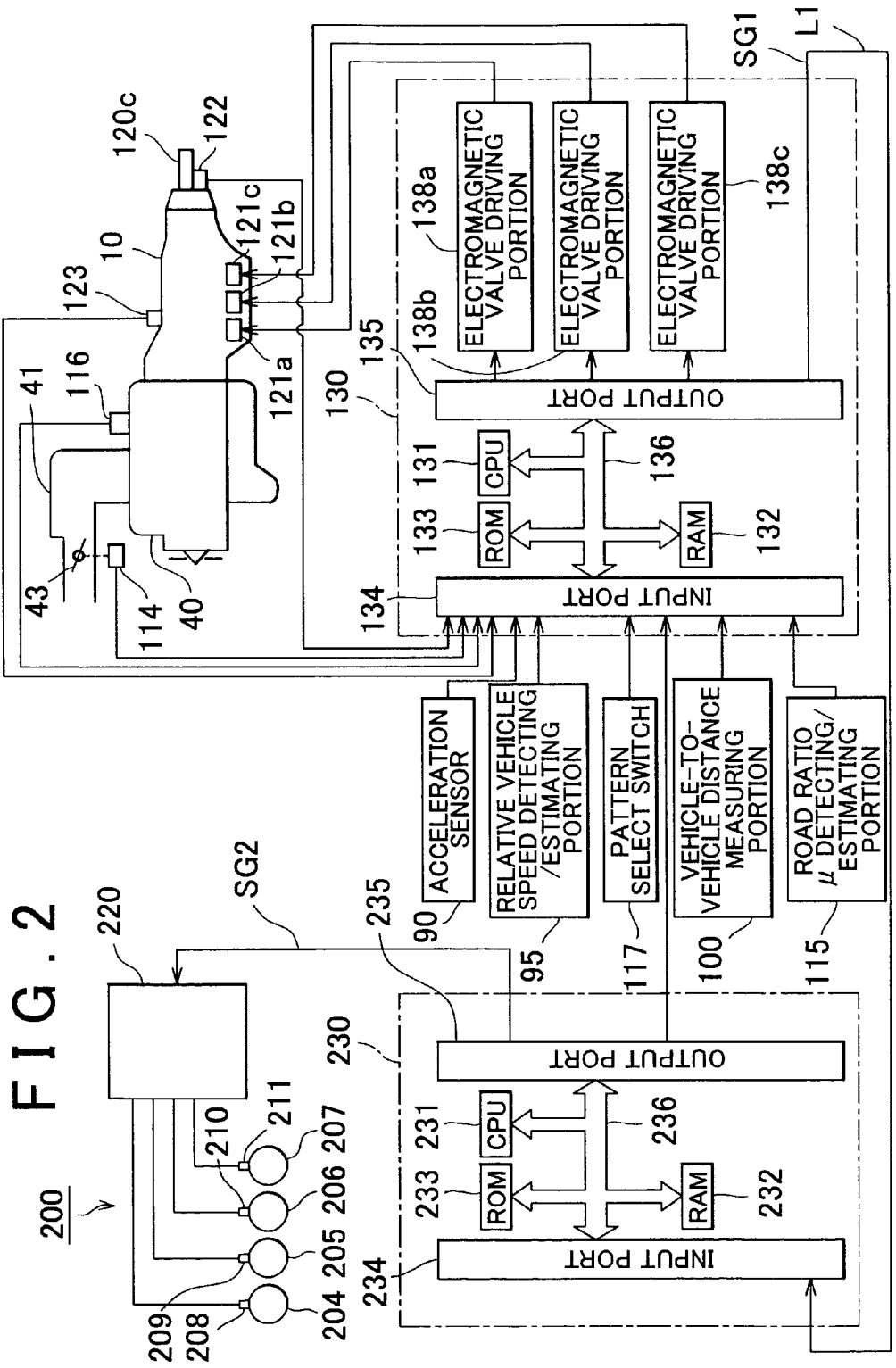

FIG.4

|     | C0 | C1 | C2 | B0 | B1 | B2 | B3 | B4 | F0 | F1 | F2 |
|-----|----|----|----|----|----|----|----|----|----|----|----|
| P   | ○  |    |    |    |    |    |    |    | ○  |    |    |
| R   |    |    | ○  | ○  |    |    |    | ○  |    |    |    |
| N   | ○  |    |    |    |    |    |    |    | ○  |    |    |
| 1st | ○  | ○  |    |    |    |    |    | ◎  | ○  |    | ○  |
| 2nd | ◎  | ○  |    |    |    |    | ○  |    | ○  |    |    |
| 3rd | ○  | ○  |    |    | ◎  | ○  |    |    | ○  | ○  |    |
| 4th | ○  | ○  | ○  |    |    | △  |    |    | ○  |    |    |
| 5th |    | ○  | ○  | ○  |    | △  |    |    |    |    |    |

○ APPLIED

◎ APPLIED WHEN ENGINE BRAKE IS ENGAGED

△ APPLIED BUT NOT TRANSMITTING POWER

FIG.5

TARGET DECELERATION MAP(G)

| | | TIME BETWEEN VEHICLES (sec) | | | | |
|---|---|---|---|---|---|---|
| | | 0 | 1.0 | 2.0 | 4.0 | 6.0 |
| RELATIVE VEHICLE SPEED (km/h) | 0   | -0.05 | 0.0   | 0.0   | 0.0   | 0.0   |
| | -10 | -0.15 | -0.10 | -0.05 | 0.0   | 0.0   |
| | -15 | -0.20 | -0.15 | -0.10 | -0.05 | 0.0   |
| | -20 | -0.25 | -0.20 | -0.15 | -0.10 | -0.05 |
| | -25 | -0.27 | -0.22 | -0.17 | -0.12 | -0.07 |
| | -30 | -0.29 | -0.24 | -0.19 | -0.14 | -0.09 |
| | -40 | -0.31 | -0.26 | -0.21 | -0.16 | -0.10 |
| | -45 | -0.33 | -0.28 | -0.23 | -0.18 | -0.13 |

FIG.6

| | TIME BETWEEN VEHICLES | | | |
|---|---|---|---|---|
| | 1.0 | 2.0 | 3.0 | 4.0 |
| RELATIVE VEHICLE SPEED -10 | −0.07 | −0.05 | −0.03 | −0.02 |
| −20 | −0.10 | −0.08 | −0.05 | −0.03 |
| −30 | −0.15 | −0.10 | −0.08 | −0.05 |
| −40 | −0.15 | −0.15 | −0.10 | −0.08 |

SPEED TARGET DECELERATION MAP EXAMPLE

FIG.7

CALCULATIONS BY ENGINE BRAKING
FORCE MAP (G) USING GEAR SPEED AND No

| No / GEAR SPEED | 1000 | 2000 | 3000 | 4000 |
|---|---|---|---|---|
| 5th | −0.04 | −0.05 | −0.06 | −0.07 |
| 4th | −0.05 | −0.06 | −0.07 | −0.08 |
| 3rd | −0.06 | −0.07 | −0.08 | −0.09 |

FIG. 13

CALCULATIONS BY DECELERATION CORRECTION QUANTITY MAP (G) USING CORNER SIZE AND No

| CORNER SIZE \ No | 1000 | 2000 | 3000 | 4000 |
|---|---|---|---|---|
| GENTLE CORNER | 0.004 | 0.005 | 0.006 | 0.007 |
| MEDIUM CORNER | 0.005 | 0.007 | 0.008 | 0.009 |
| HAIRPIN CORNER | 0.01 | 0.015 | 0.017 | 0.02 |

FIG. 14

CALCULATIONS BY DECELERATION CORRECTION QUANTITY MAP (G) USING ROAD RATIO $\mu$ AND No

| $\mu$ \ No | 1000 | 2000 | 3000 | 4000 |
|---|---|---|---|---|
| 1.0 | 0.0 | 0.0 | 0.0 | 0.0 |
| 0.5 | 0.002 | 0.003 | 0.004 | 0.006 |
| 0.2 | 0.005 | 0.015 | 0.017 | 0.02 |

DECELERATION CONTROL APPARATUS AND METHOD FOR A VEHICLE

INCORPORATION BY REFERENCE

The disclosure of Japanese Patent Application No. 2003-407780 filed on Dec. 5, 2003 including the specification, drawings and abstract is incorporated herein by reference in its entirety.

BACKGROUND OF THE INVENTION

1. Field of the Invention

The invention relates to a deceleration control apparatus and method for a vehicle. More particularly, the invention relates to a deceleration control apparatus and method for a vehicle, which controls the deceleration of the vehicle by operation of a brake system which applies braking force to the vehicle and a shift operation that shifts an automatic transmission into a relatively lower speed or speed ratio.

2. Description of the Related Art

Deceleration control is known which performs both a downshift in an automatic transmission and operation of a brake system so that the distance between a host vehicle and a preceding vehicle does not become equal to, or less than, a predetermined value. JP(A) 2001-30792 discloses technology which, when a target deceleration can not be achieved by fully closing the throttle valve and the downshift alone, achieves the target deceleration by fully closing a throttle valve and operating an automatic brake without performing a downshift, which improves riding comfort by avoiding shift shock generated by the downshift. Further, when the target deceleration is higher than a predetermined deceleration, it is regarded as an emergency so the deceleration control simultaneously fully closes the throttle valve, executes a downshift, and operates the automatic brake. (When the deceleration is referred to in this specification, it is understood to be high when the absolute value of the deceleration is large and low when the absolute value of the deceleration is small.)

Patent No. 3123384 discloses a deceleration control by a downshift of a transmission (i.e., downshift deceleration control) which is executed when the distance between vehicles is small. According to this technology, when the distance between vehicles (hereinafter, also referred to as "vehicle-to-vehicle distance") becomes even smaller, a deceleration control by braking the wheels (i.e., braking deceleration control) is executed together with the downshift deceleration control. When this braking deceleration control is started within a predetermined period of time after the downshift deceleration control has started, however, the downshift deceleration control is cancelled by canceling means. As a result, deceleration control is performed by only braking the wheels so no sense of discomfort is imparted to the driver and good running is able to be achieved.

In the deceleration control, there are advantages and disadvantages to both the shift control that shifts the transmission into a lower speed and the brake control that operates the brake system. Shift control is advantageous in that the engine braking force increases steadily. A disadvantage of the shift control, on the other hand, is that response and controllability are poor. In comparison, brake control is advantageous in that it offers good response and controllability. The disadvantage of brake control, however, is that, from the viewpoint of durability and reliability, the brakes can not be continually applied for an extended period of time.

The technology disclosed in JP(A) 2001-30792 only executes a downshift and brake control simultaneously in cases of emergency because doing so adversely effects drivability. The technology disclosed in Patent No. 3123384 cancels the deceleration control by a downshift when the brake control starts.

Neither of the technologies described above simultaneously and actively execute a downshift and brake control, and thus do not incorporate all of the advantages (the good response and controllability of brake control and the steady increase in engine braking force of a downshift) of executing a downshift and brake control simultaneously. In order to take full advantage of the advantages of both shift control and brake control, it is desirable to perform deceleration control that executes shift control and brake control simultaneously, but yet does not impart an unpleasant sensation to the driver.

SUMMARY OF THE INVENTION

In view of the foregoing problems, this invention thus provides a deceleration control apparatus for a vehicle, which performs deceleration control on the vehicle that incorporates the advantages of both control of a brake system that applies braking force to the vehicle and shift control that shifts an automatic transmission into a relatively low speed or speed ratio.

Thus, one aspect of the invention relates to a deceleration control apparatus for a vehicle, which performs deceleration control of the vehicle based on a distance between the vehicle and an obstacle including a preceding vehicle ahead of the vehicle. This deceleration control apparatus is provided with a controller which i) obtains, based on the distance, a target deceleration at which the vehicle is to be decelerated; ii) selects, as a speed or speed ratio of a transmission of the vehicle during a shift operation, the speed or speed ratio that will apply a deceleration equal to, or less than, the target deceleration to the vehicle; and iii) executes the deceleration control by an operation of a brake system which applies a braking force to the vehicle and a shift operation which shifts the transmission of the vehicle into a relatively low speed or speed ratio. (Note: the degree of deceleration referred to here and throughout this specification refers to the size of the absolute value of the deceleration.)

Another aspect of the invention relates to a deceleration control method for a vehicle, by which deceleration control of the vehicle is performed based on a distance between the vehicle and an obstacle including a preceding vehicle ahead of the vehicle. This deceleration control method includes the steps of obtaining, based on the distance, a target deceleration at which the vehicle is to be decelerated; selecting, as a speed or speed ratio of a transmission of the vehicle during a shift operation, the speed or speed ratio that will apply a deceleration equal to, or less than, the target deceleration to the vehicle; and executing the deceleration control by an operation of a brake system which applies a braking force to the vehicle and a shift operation which shifts the transmission of the vehicle into a relatively low speed or speed ratio.

According to the deceleration control apparatus and method for a vehicle as described above, because a speed or speed ratio that will apply a deceleration equal to, or less than, the target deceleration to the vehicle is selected as the speed or speed ratio of a transmission of the vehicle during a shift operation, the deceleration will not become excessive so no sense of discomfort will be imparted to the driver, even when the deceleration operation by the operation of the brake system and the shift operation is performed. Furthermore, because a speed or speed ratio that applies a deceleration equal to, or less than, the target deceleration to the vehicle is selected as the speed or speed ratio of the transmission during the shift operation, the engine brake will continue to be effective even after the distance and relative vehicle speed and the like become equal to, or greater than, the respective target values so that the operation of the brake system ends. As a result, a change in the distance is able to be kept small.

In the deceleration control according to the invention as described above, the operation of the brake system (i.e., brake control) and the shift operation (i.e., shift control) can be executed simultaneously in cooperation with one another. The deceleration here refers to the degree (amount) of vehicle deceleration represented by the deceleration or deceleration torque. The target deceleration may include both a maximum target deceleration obtained at the start of the deceleration control, and a target deceleration obtained in real time when the actual deceleration of the vehicle substantially matches the target deceleration. The selected speed or speed ratio may be a speed or speed ratio that applies a deceleration to the vehicle which is both larger than that applied by the speed or speed ratio during the deceleration control, and equal to, or less than, the maximum target deceleration. The brake system is operated substantially simultaneously with the shift operation into the selected speed or speed ratio such that the actual deceleration of the vehicle substantially matches the target deceleration.

BRIEF DESCRIPTION OF THE DRAWINGS

The above-mentioned objects, features, advantages, technical and industrial significance of this invention will be better understood by reading the following detailed description of exemplary embodiments of the invention, when considered in connection with the accompanying drawings, in which:

FIG. 2 is a block diagram schematically showing the deceleration control apparatus for a vehicle according to the first exemplary embodiment of the invention;

FIG. 4 is a table showing engagement/disengagement combinations of the automatic transmission of the deceleration control apparatus for a vehicle shown in FIG. 3;

FIG. 5 is a target deceleration map of the deceleration control apparatus for a vehicle according to the first exemplary embodiment of the invention;

FIG. 6 is a speed target deceleration of the deceleration control apparatus for a vehicle according to the first exemplary embodiment of the invention;

FIG. 7 is a view showing a deceleration produced by an output shaft rotation speed and the speed in the deceleration control apparatus for a vehicle according to the first exemplary embodiment of the invention;

FIG. 13 is a chart showing correction quantities for the deceleration for each corner size and output shaft rotation speed in the deceleration control apparatus for the vehicle according to the third exemplary embodiment of the invention; and FIG. 14 is a chart showing correction quantities for the deceleration for each road ratio μ and output shaft rotation speed in a deceleration control apparatus for the vehicle according to a fourth exemplary embodiment of the invention.

DETAILED DESCRIPTION OF THE PREFERRED EMBODIMENTS

Figure 1A:
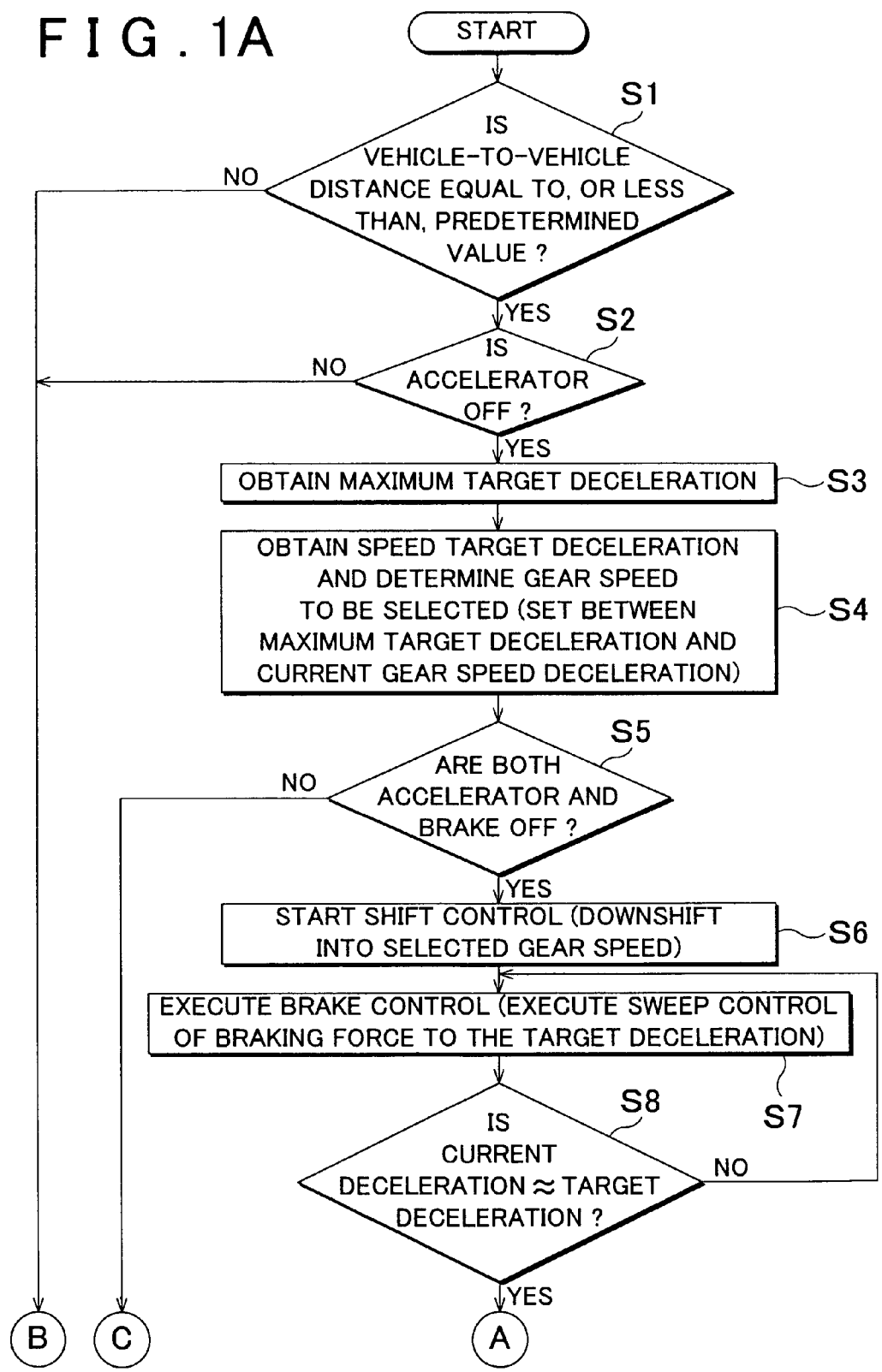
FIG. 1A is a flowchart illustrating a first part of an operation by a deceleration control apparatus for a vehicle according to a first exemplary embodiment of the invention.

In the following description and the accompanying drawings, the present invention will be described in more detail with reference to exemplary embodiments.

A first exemplary embodiment of the invention will now be described with reference to FIGS. 1A to 10. This exemplary embodiment relates to a deceleration control apparatus for a vehicle, which performs cooperative control of a brake (i.e., a brake system) and an automatic transmission.

This exemplary embodiment provides a deceleration control that incorporates the advantages of good response and controllability offered by the brakes by performing brake control (automatic brake control), as well as the advantage of increased engine braking offered by a downshift by performing shift control (downshift control by an automatic transmission), in cooperation with one another when it is detected, based on vehicle-to-vehicle distance information, that the distance between vehicles is equal to, or less than, a predetermined value.

In terms of the structure of this exemplary embodiment, it is assumed that means capable of measuring the distance between the host vehicle and a preceding vehicle, and a deceleration control apparatus that operates an automatic brake or a regenerative brake (hereinafter simply referred to as "brake") and a shift control of an automatic transmission (an AT (automatic transmission), a CVT (continuously variable transmission), or an AT mounted in a hybrid vehicle) in cooperation with one another based on that distance information, are provided.

FIG. 2 shows an automatic transmission 10, an engine 40, and a brake system 200. The automatic transmission 10 is capable of achieving five speeds (1st speed to 5th speed) by controlling hydraulic pressure, which is done by energizing and de-energizing electromagnetic valves 121a, 121b, and 121c. FIG. 2 shows three electromagnetic valves 121a, 121b, and 121c, but their number is not limited to this. These electromagnetic valves 121a, 121b, and 121c are driven by signals sent from a control circuit 130.

A throttle opening amount sensor 114 detects an opening amount of a throttle valve 43 disposed inside an intake passage 41 of the engine 40. An engine speed sensor 116 detects the speed of the engine 40. A vehicle speed sensor 122 detects the rotation speed an output shaft 120c of the automatic transmission 10 in proportion to the vehicle speed. A shift position sensor 123 detects a shift position of the automatic transmission 10. A pattern select switch 117 is used when selecting a shift pattern of the automatic transmission 10. An acceleration sensor 90 detects a deceleration of the vehicle (hereinafter simply referred to as "deceleration"). A relative vehicle speed detecting/estimating portion 95 detects or estimates the relative speed between a host vehicle and a preceding vehicle. A vehicle-to-vehicle distance measuring portion 100 has a sensor such as a laser radar sensor or a millimeter wave radar sensor mounted on the front of the vehicle, which is used to measure the distance to the preceding vehicle. A road ratio μ detecting/estimating portion 115 detects or estimates a friction coefficient of the road surface (hereinafter referred to as "road ratio") μ.

The signals indicative of the various detection results from the throttle opening amount sensor 114, the engine speed sensor 116, the vehicle speed sensor 122, the shift position sensor 123, and the acceleration sensor 90 are all input to the control circuit 130. Also input to the control circuit 130 is a signal indicative of the switching state of the pattern select switch 117, signals indicative of the detection or estimation results from the road ratio μ detecting/estimating portion 115 and the relative vehicle speed detecting/estimating portion 95, and a signal indicative of the measuring results from the vehicle-to-vehicle distance measuring portion 100.

The control circuit 130 is a known micro-computer and includes a CPU 131, RAM 132, ROM 133, an input port 134, an output port 135, and a common bus 136. Signals from the various sensors 114, 116, 122, 123, and 90, as well as signals from the pattern select switch 117, the relative vehicle speed detecting/estimating portion 95, the road ratio 1 detecting/estimating portion 115, and the vehicle-to-vehicle distance measuring portion 100 are all input to the input port 134. Electromagnetic valve driving portions 138a, 138b, and 138c, as well as a brake braking force signal line L1 leading to a brake control circuit 230 are all connected to the output port 135. The brake braking force signal line L1 transmits a brake braking force signal SG1.

Figure 1B:
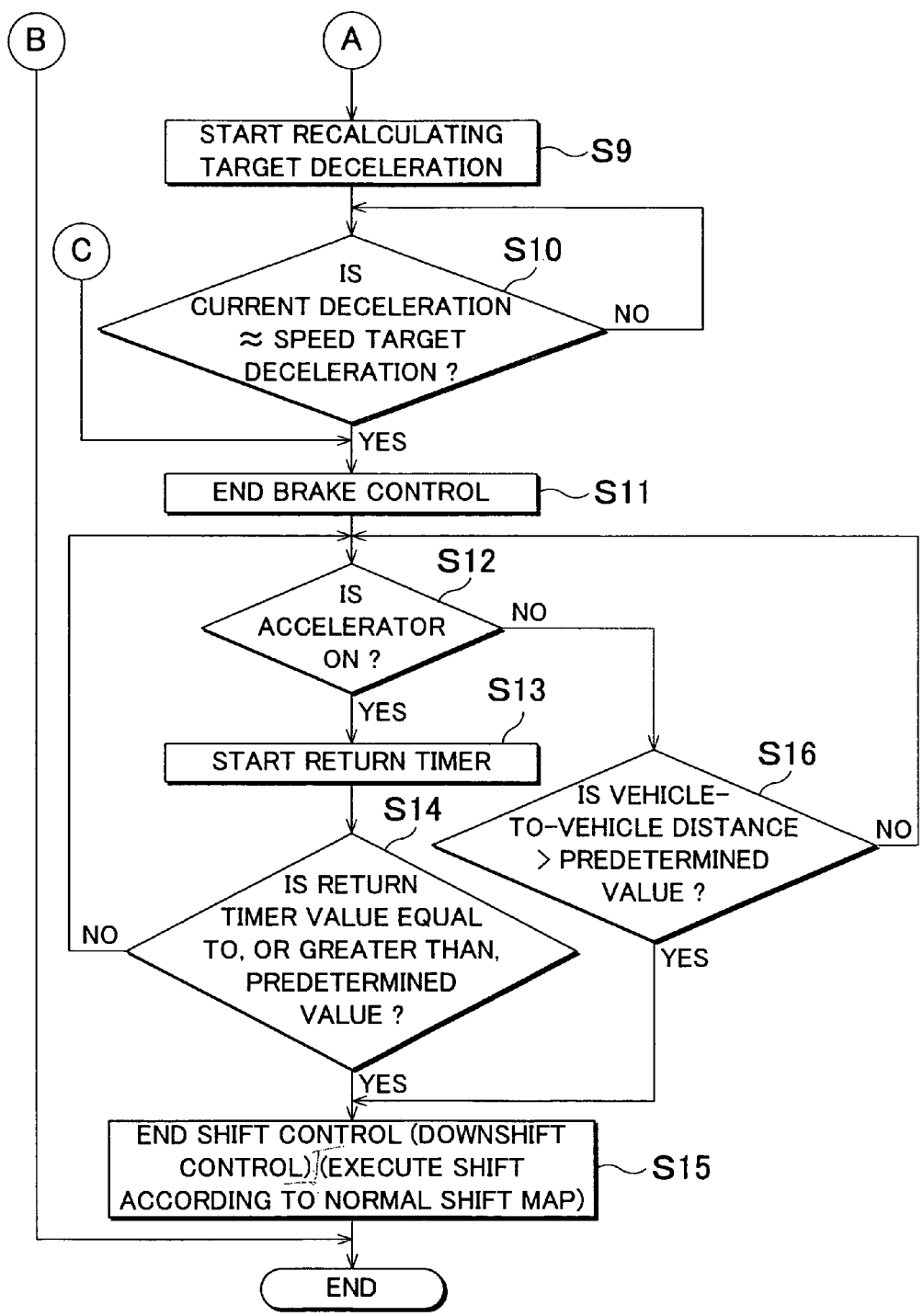
FIG. 1B is a is a flowchart illustrating a second part of the operation by a deceleration control apparatus for a vehicle according to the first exemplary embodiment of the invention.

An operation (control steps) illustrated in the flowchart in FIG. 1A and FIG. 1B, in addition to a shift map for shifting the speed of the automatic transmission 10 and an operation for shift control (not shown), is stored in the ROM 133 in advance. The control circuit 130 shifts the automatic transmission 10 based on the various control conditions that are input.

The brake system 200 is controlled by the brake control circuit 230, into which the brake braking force signal SG1 is input from the control circuit 130, so as to brake the vehicle. The brake system 200 includes a hydraulic pressure control circuit 220 and brake devices 208, 209, 210, and 211 provided on vehicle wheels 204, 205, 206, and 207, respectively. Each brake device 208, 209, 210, and 211 controls the braking force of the corresponding wheel 204, 205, 206, and 207 according to a brake hydraulic pressure which is controlled by the hydraulic pressure control circuit 220. The hydraulic pressure control circuit 220 is controlled by the brake control circuit 230.

The hydraulic pressure control circuit 220 performs brake control by controlling the brake hydraulic pressure supplied to each brake device 208, 209, 210, and 211 based on a brake control signal SG2 that ultimately determines the braking force to be applied to the vehicle. The brake control signal SG2 is generated by the brake control circuit 230 based on the brake braking force signal SG1 that the brake control circuit 230 receives from the control circuit 130 of the automatic transmission 10.

The brake control circuit 230 is a known micro-computer and includes a CPU 231, RAM 232, ROM 233, an input port 234, an output port 235, and a common bus 236. The hydraulic pressure control circuit 220 is connected to the output port 235. The operation for generating the brake control signal SG2 based on the various data included in the brake braking force signal SG1 is stored in the ROM 233 in advance. The brake control circuit 230 controls the brake system 200 (i.e., performs brake control) based on the various control conditions that are input.

Figure 3:
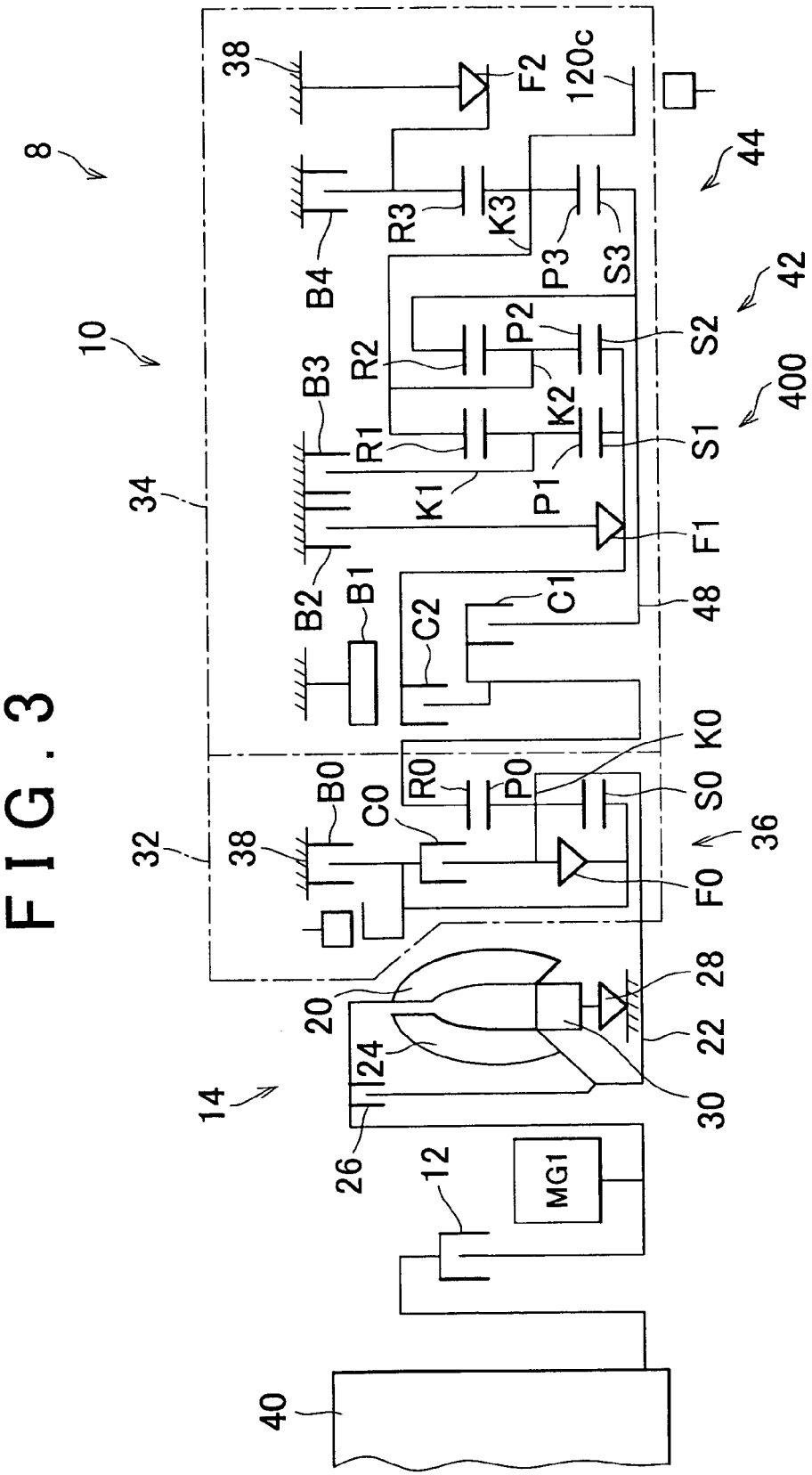
FIG. 3 is a skeleton view of an automatic transmission of the deceleration control apparatus for a vehicle according to the first exemplary embodiment of the invention.

The structure of the automatic transmission 10 is shown in FIG. 3. In the drawing, output from the engine 40, i.e., an internal combustion engine which serves as the driving source for running the vehicle, is input to the automatic transmission 10 via an input clutch 12 and a torque converter 14, which is a hydraulic power transmitting device, and transmitted to driven wheels via a differential gear unit and an axle, not shown. A first motor/generator MG1 which functions as both an electric motor and a generator is arranged between the input clutch 12 and the torque converter 14.

The torque converter 14 includes a pump impeller 20 which is coupled to the input clutch 12, a turbine runner 24 which is coupled to an input shaft 22 of the automatic transmission 10, a lock-up clutch 26 for locking the pump impeller 20 and the turbine runner 24 together, and a stator 30 that is prevented from rotating in one direction by a one-way clutch 28.

The automatic transmission 10 includes a first transmitting portion 32 which switches between a high speed and a low speed, and a second transmitting portion 34 which is capable of switching between a reverse speed and four forward speeds. The first transmitting portion 32 includes an HL planetary gearset 36, a clutch C0, a one-way clutch F0, and a brake B0. The HL planetary gearset 36 includes a sun gear S0, a ring gear R0, and planetary gears P0 that are rotatably supported by a carrier K0 and in mesh with the sun gear S0 and the ring gear R0. The clutch C0 and the one-way clutch F0 are provided between the sun gear S0 and the carrier K0, and the brake B0 is provided between the sun gear S0 and a housing 38.

The second transmitting portion 34 includes a first planetary gearset 400, a second planetary gearset 42, and a third second planetary gearset 44. The first planetary gearset 400 includes a sun gear S1, a ring gear R1, and planetary gears P1 that are rotatably supported by a carrier K1 and in mesh with the sun gear S1 and the ring gear R1. The second planetary gearset 42 includes a sun gear S2, a ring gear R2, and planetary gears P2 that are rotatably supported by a carrier K2 and in mesh with the sun gear S2 and the ring gear R2. The third planetary gearset 44 includes a sun gear S3, a ring gear R3, and planetary gears P3 that are rotatably supported by a carrier K3 and in mesh with the sun gear S3 and the ring gear R3.

The sun gear S1 and the sun gear S2 are integrally coupled together, while the ring gear R1 and the carrier K2 and the carrier K3 are integrally coupled together. The carrier K3 is coupled to the output shaft 120c. Similarly, the ring gear R2 is integrally coupled to the sun gear S3 and an intermediate shaft 48. A clutch C1 is provided between the ring gear R0 and the intermediate shaft 48, and a clutch C2 is provided between the sun gear S1 and the sun gear S2, and the ring gear R0. Also, a band brake B1 is provided on the housing 38 in order to prevent the sun gear S1 and the sun gear S2 from rotating. Further, a one-way clutch F1 and a brake B2 are provided in series between the sun gear S1 and the sun gear S2, and the housing 38. The one-way clutch F1 applies when the sun gear S1 and the sun gear S2 try to rotate in the direction opposite that of the input shaft 22.

A brake B3 is provided between the carrier K1 and the housing 38, and a brake B4 and a one-way clutch F2 are provided in parallel between the ring gear R3 and the housing 38. The one-way clutch F2 applies when the ring gear R3 tries to rotate in the direction opposite that of the input shaft 22.

The automatic transmission 10 of the above-described structure is able to switch between any of one reverse speed and five forward speeds (1st to 5th) of different speed ratios, according to the table showing engagement/disengagement combinations of the automatic transmission shown in FIG. 4, for example. In the table in FIG. 4, the single circle indicates application, a blank space indicates release, a double circle (bulls-eye) indicates application when the engine brake is engaged, and a triangle indicates application but with no power being transmitted. The clutches C0 to C2 and the brakes B0 to B4 are all hydraulic friction apply devices that are applied by hydraulic actuators.

Next, operation of the first exemplary embodiment will be described with reference to FIGS. 1A and 1B.

First in step S1 of FIG. 1A, the control circuit 130 determines whether the distance between the host vehicle and the preceding vehicle is equal to, or less than, a predetermined value based on a signal indicative of the vehicle-to-vehicle distance input from the vehicle-to-vehicle distance measuring portion 100. If it is determined that the vehicle-to-vehicle distance is equal to, or less than, the predetermined value, then step S2 is executed. If, on the other hand, it is determined that the vehicle-to-vehicle distance is not equal to, nor less than, the predetermined value, the control flow ends.

Instead of directly determining whether the vehicle-to-vehicle distance is equal to, or less than, the predetermined value, the control circuit 130 may also indirectly determine whether the vehicle-to-vehicle distance is equal to, or less than, the predetermined value by a parameter by which it can be known that the vehicle-to-vehicle distance is equal to, or less than, the predetermined value, such as the time to collision (vehicle-to-vehicle distance/relative vehicle speed), the time between vehicles (vehicle-to-vehicle distance/host vehicle speed), or a combination of the two.

In step S2, the control circuit 130 determines whether the accelerator is off based on a signal output from the throttle opening amount sensor 114. If it is determined in step S2 that the accelerator is off, then step S3 is executed. Vehicle-following control starts from step S3. If, on the other hand, it is determined that the accelerator is not off, the control flow ends.

In step S3, the control circuit 130 obtains a target deceleration. The target deceleration is obtained as a value (deceleration) with which the relationship with the preceding vehicle comes to equal the target vehicle-to-vehicle distance or relative vehicle speed when deceleration control based on that target deceleration (to be described later) is executed in the host vehicle. The signal indicative of the target deceleration is output as a brake braking force signal SG1 from the control circuit 130 to the brake control circuit 230 via the brake braking force signal line L1.

The target deceleration is obtained referencing a target deceleration map (FIG. 5) stored in the ROM 133 beforehand. As shown in FIG. 5, the target deceleration is obtained based on the relative speed (km/h) and time (sec) between the vehicles. Here, the time between vehicles is the vehicle-to-vehicle distance divided by the host vehicle speed, as described above.

In FIG. 5, for example, when the relative vehicle speed (here the relative vehicle speed equals the preceding vehicle speed minus the host vehicle speed) is −20 [km/h] and the time between the vehicles is 1.0 [sec], the target deceleration is −0.20 (G). The target deceleration is set to a smaller value (so that the vehicle will not decelerate) the closer the relationship between the host vehicle and the preceding vehicle is to a safe relative vehicle speed and vehicle-to-vehicle distance. That is, the target deceleration is obtained as a value that has a smaller absolute value on the upper right side of the target deceleration map in FIG. 5 the greater the distance between the host vehicle and the preceding vehicle. On the other hand, the target deceleration is obtained as a value that has a larger absolute value on the lower left side of the target deceleration map in FIG. 5 the closer the distance between the host vehicle and the preceding vehicle.

The target deceleration obtained in step S3 is referred to as the target deceleration, or more specifically, the maximum target deceleration, for before the shift control (step S6) and the brake control (step S7) are actually performed (i.e., at the starting point of the deceleration control) after the conditions to start the deceleration control (steps S1 and S2) have been satisfied. That is, because the target deceleration is obtained in real time even while the deceleration control is being executed, as will be described later, the target deceleration obtained in step S3 is referred to specifically as the maximum target deceleration in order to differentiate it from the target deceleration obtained after the brake control and shift control have actually been executed (i.e., while the brake control and shift control are being executed). After step S3, step S4 is executed.

In step S4, the control circuit 130 obtains the target deceleration produced by the automatic transmission 10 (hereinafter referred to as "speed target deceleration"), and then determines the speed to be selected for the shift control (downshift) of the automatic transmission 10 based on the speed target deceleration. The details of step S4 are described broken down into two parts ((1) and (2)) as follows.

(1) First, the speed target deceleration is obtained. The speed target deceleration corresponds to the engine braking force (deceleration) to be obtained by the shift control of the automatic transmission 10. The speed target deceleration is set to be a value equal to, or less than, the maximum target deceleration. When the deceleration is referred to in this specification, it is understood to be high when the absolute value of the deceleration is large and low when the absolute value of the deceleration is small. The speed target deceleration can be obtained by any of the following three methods.

The first of the three methods for obtaining the speed target deceleration is as follows. The speed target deceleration is set in step 3 as the product of a coefficient greater than 0 but equal to, or less than, 1 to the maximum target deceleration obtained from the target deceleration map in FIG. 5. For example, when the maximum target deceleration is −0.20 G, as in the case of the example in step S3, the speed target deceleration can be set to −0.10 G, which is the product of the maximum target deceleration −0.20 G multiplied by the coefficient 0.5, for example.

The second of the three methods for obtaining the speed target deceleration is as follows. A speed target deceleration map (FIG. 6) is stored in the ROM 133 in advance. The speed target deceleration can then be obtained referencing this speed target deceleration map in FIG. 6. As shown in FIG. 6, the speed target deceleration can be obtained based on the relative vehicle speed [km/h] and the time [sec] between the host vehicle and the preceding vehicle, just like the target deceleration in FIG. 5. For example, if the relative vehicle speed is −20 [km/h] and the time between vehicles is 1.0 [sec], as in the case of the example in step S3, a speed target deceleration of −0.10 G can be obtained. As is evident from FIGS. 5 and 6, when i) the relative vehicle speed is high so that the vehicles suddenly come close to one another, ii) the time between vehicles is short, or iii) the vehicle-to-vehicle distance is short, the vehicle-to-vehicle distance must be appropriately established early on, so the deceleration must be made larger. This also results in a lower speed being selected in the above-described situation.

The third of the three methods for obtaining the speed target deceleration is as follows. First, the engine braking force (deceleration G) when the accelerator is off in the current gear speed of the automatic transmission 10 is obtained (hereinafter simply referred to as the "current gear speed deceleration"). A current gear speed deceleration map (FIG. 7) is stored in advance in the ROM 133. The current gear speed deceleration (deceleration) can be obtained referencing this current gear speed deceleration map in FIG. 7. As shown in FIG. 7, the current gear speed deceleration can be obtained based on the gear speed and the rotation speed No of the output shaft 120c of the automatic transmission 10. For example, when the current gear speed is 5th speed and the output rotation speed is 1000 [rpm], the current gear speed deceleration is −0.04 G.

The current gear speed deceleration may also be a value obtained from the current gear speed deceleration map, which is corrected according to the situation, for example, according to whether an air conditioner of the vehicle is being operated, whether there is a fuel cut, and the like. Further, a plurality of current gear speed deceleration maps, one for each situation, may be provided in the ROM 133, and the current gear speed deceleration map used may be switched according to the situation.

Figure 8:
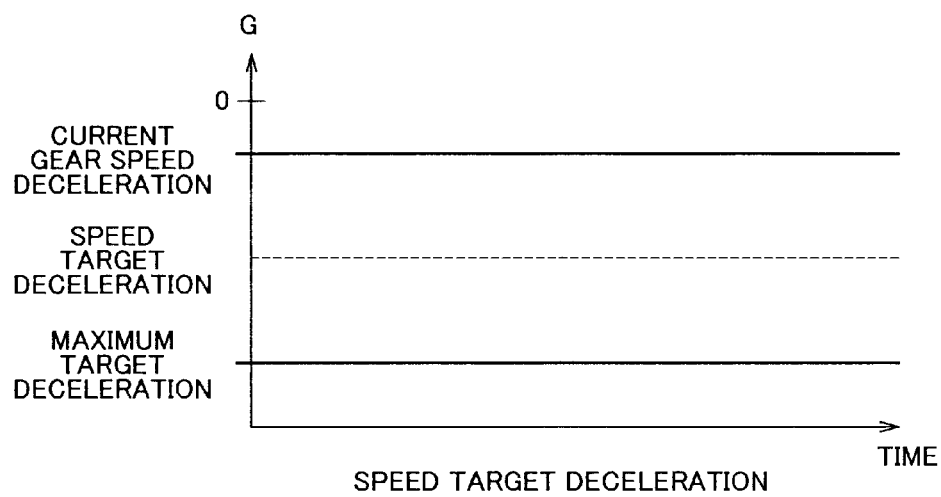
FIG. 8 is a view showing the relationship between the speed target deceleration, the current gear speed deceleration, and the maximum target deceleration in the deceleration control apparatus for a vehicle according to the first exemplary embodiment of the invention.

Next, the speed target deceleration is set as a value between the current gear speed deceleration and the maximum target deceleration. That is, the speed target deceleration is obtained as a value that is larger than the current gear speed deceleration but equal to, or less than, the maximum target deceleration. One example of the relationship between the speed target deceleration, the current gear speed deceleration, and the maximum target deceleration is shown in FIG. 8.

The speed target deceleration can be obtained by the following expression.

speed target deceleration=(maximum target deceleration−current gear speed deceleration)×coefficient+current gear speed deceleration In the above expression, the coefficient is a value greater than 0 but equal to, or less than, 1.

In the above example, the maximum target deceleration is −0.20 G and the current gear speed deceleration is −0.04 G. When calculated with a coefficient of 0.5, the speed target deceleration is −0.12 G.

As described above, in the first through third methods for obtaining the speed target deceleration, a coefficient is used. The value of this coefficient, however, is not obtained theoretically, but is a suitable value that is able to be set appropriately from the various conditions. That is, in a sports car, for example, a relatively large deceleration is preferable when decelerating, so the coefficient can be set to a large value. Also, in the same vehicle, the value of the coefficient can be variably controlled according to the vehicle speed or the gear speed. In a vehicle in which a sport mode (which aims to increase the vehicle response to an operation by the driver so as to achieve crisp and precise handling), a luxury mode (which aims to achieve a relaxed and easy response to an operation by the driver), and an economy mode (which aims to achieve fuel efficient running) are available, when the sport mode is selected, the speed target deceleration is set so that a larger speed change occurs than would occur in the luxury mode or the economy mode.

After being obtained in step S4, the speed target deceleration is not reset until the deceleration control ends. That is, the speed target deceleration is set so that, once it is obtained at the starting point of the deceleration control (i.e., the point at which the shift control (step S6) and the brake control (step S7) actually start), it is the same value until the deceleration control ends. As shown in FIG. 8, the speed target deceleration (the value shown by the broken line) is a constant value over time.

(2) Next, the speed to be selected during the shift control of the automatic transmission 10 is determined based on the speed target deceleration obtained in part (1) above. Vehicle characteristic data indicative of the deceleration G at each speed in each gear speed when the accelerator is off, such as that shown in FIG. 9, is stored in advance in the ROM 133.

Figure 9:
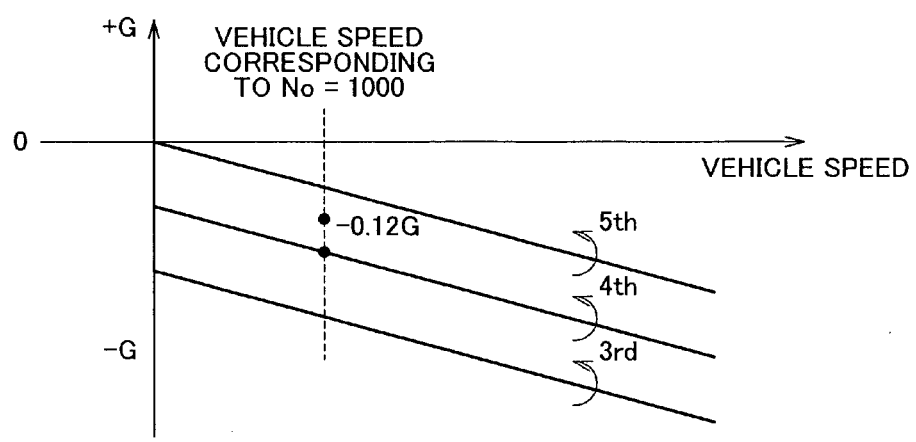
FIG. 9 is a graph illustrating the deceleration for each vehicle speed in each gear speed in the deceleration control apparatus for a vehicle according to the first exemplary embodiment of the invention.

Here, assuming a case in which the output rotation speed is 1000 [rpm] and the speed target deceleration is −0.12 G, just as in the example given above, the gear speed corresponding to the vehicle speed when the output speed is 1000 [rpm] and the deceleration is closest to the speed target deceleration of −0.12 G is 4th speed, as can be seen in FIG. 9. Accordingly, in the case of the above example, it would be determined in step S4 that the gear speed to be selected is 4th speed.

Here, the gear speed that would achieve a deceleration closest to the speed target deceleration is selected as the gear speed to be selected. Alternatively, however, the gear speed to be selected may be a gear speed that would achieve a deceleration which is both equal to, or less than, (or equal to, or greater than,) the speed target deceleration, and closest to the speed target deceleration. After step S4, step S5 is executed.

In step S5, the control circuit 130 determines whether the accelerator and the brake are off. In step S5, when the brake is off, it means that the brake is off because a brake pedal (not shown) is not being operated by the driver. This determination is made based on output from a brake sensor (not shown) that is input via the brake control circuit 230. If it is determined in step S5 that both the accelerator and the brake are off, step S6 is executed. If, on the other hand, it is not determined that both the accelerator and the brake are off, step S11 is executed.

Figure 10:
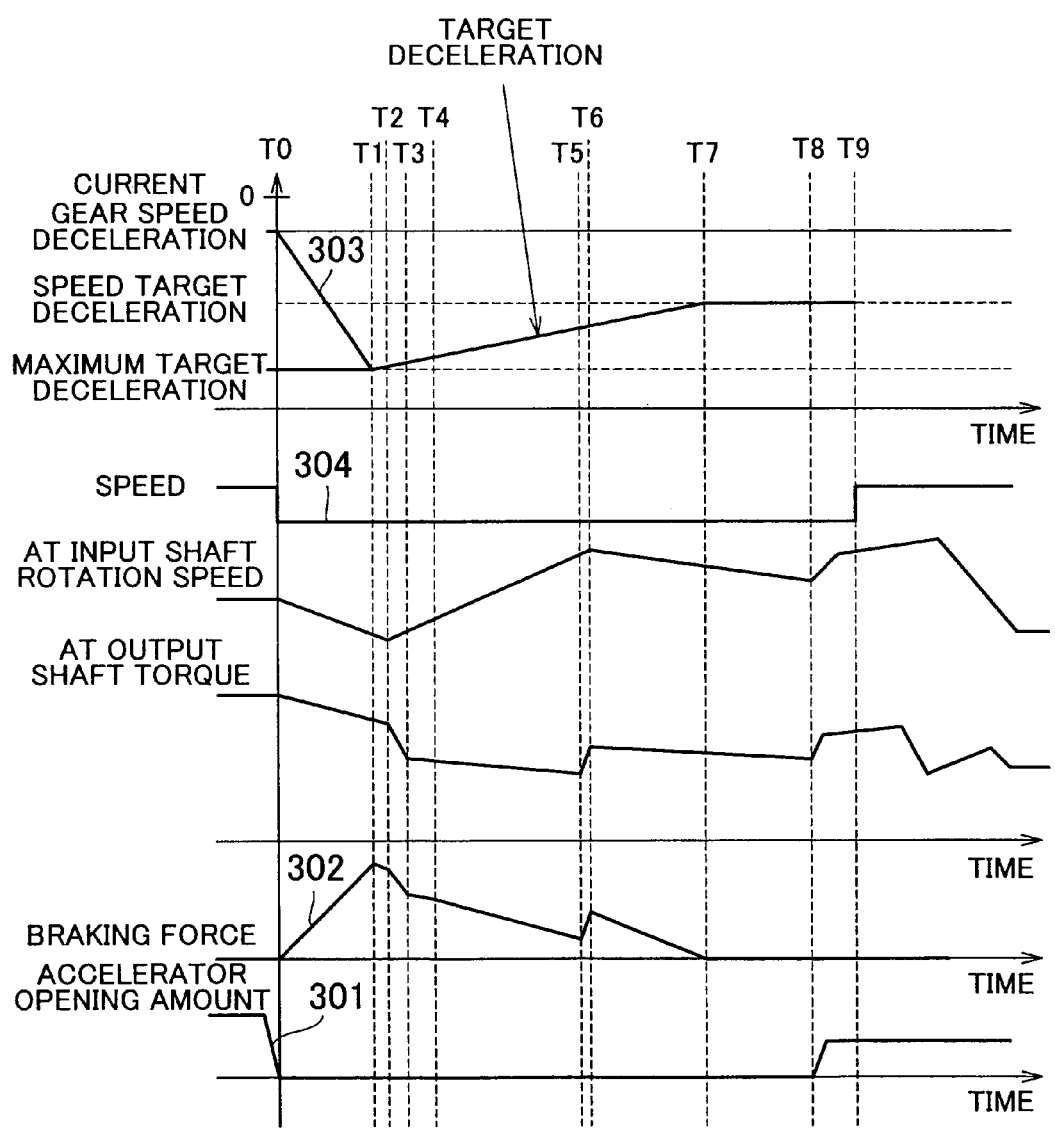
FIG. 10 is time chart illustrating the operation of the deceleration control apparatus for a vehicle according to the first exemplary embodiment of the invention.

FIG. 10 is a time chart illustrating the deceleration control of this exemplary embodiment. The drawing shows the current gear speed deceleration, the speed target deceleration, the maximum target deceleration, the speed of the automatic transmission 10, the rotation speed of the input shaft of the automatic transmission 10 (AT), the torque of the output shaft of the AT, the braking force, and the accelerator opening amount.

At time T0 in FIG. 10, the brake is off (i.e., braking force equals zero), as shown by reference numeral 302, and the accelerator is off (i.e., the accelerator opening amount is zero with the accelerator being fully closed), as shown by reference numeral 301. At time T0, the current deceleration (deceleration) is the same as the current gear speed deceleration, as shown by reference numeral 303.

In step S6, the control circuit 130 starts the shift control. That is, the automatic transmission 10 is shifted to the selected gear speed (4th speed in this example) that was determined in step S4. The automatic transmission 10 is downshifted by the shift control at time T0 in FIG. 10, as shown by reference numeral 304. As a result, the engine braking force increases, so the current deceleration 303 starts to increase from time T0. After step S6, step S7 is executed.

In step S7, the brake control circuit 230 starts the brake control. That is, the braking force is gradually increased (sweep control) at a predetermined gradient until the target deceleration. From time T0 to time T1 in FIG. 10, the braking force 302 increases at a predetermined gradient, which results in an increase in the current deceleration 303. The braking force 302 continues to increase until the current deceleration 303 reaches the target deceleration at time T1 (step S8).

In step S7, the brake control circuit 230 generates the brake control signal SG2 based on the brake braking force signal SG1 input from the control circuit 130, and outputs that brake control signal SG2 to the hydraulic pressure control circuit 220. As described above, the hydraulic pressure control circuit 220 generates the braking force 302 as indicated by the brake control signal SG2 by controlling the hydraulic pressure supplied to the brake devices 208, 209, 210, and 211 based on the brake control signal SG2.

The predetermined gradient in step S7 is determined by the brake braking force signal SG1 which is referenced when generating the brake control signal SG2. The predetermined gradient is indicated by the brake braking force signal SG1 and can be changed based on the road ratio μ, the accelerator return rate at the start of the control (immediately before time T0 in FIG. 10), or the opening amount of the accelerator before it is returned. For example, the gradient (slope) is set small when the road ratio μ is small and large when the accelerator return rate or the opening amount of the accelerator before it is returned is large.

Instead of a method that increases the braking force 302 at a predetermined gradient, as described above, feedback control of the braking force 302 applied to the vehicle can be performed based on the difference between the current deceleration 303 and the target deceleration so that the current deceleration 303 becomes the target deceleration. Further, the braking force 302 by the brake control may be determined taking into account a time differential value of the rotation speed of the input shaft of the automatic transmission 10 and a shift inertia torque amount determined by the inertia.

Here, both the maximum target deceleration obtained in step S3 and the target deceleration obtained again in step S9, which will be described later, are included in the "target deceleration" in step S7. The brake control of step S7 continues to be executed until it is ended in step S11. After step S7, step S8 is executed.

In step S8, the control circuit 130 determines whether the current deceleration 303 is the target deceleration. If it is determined that the current deceleration 303 is the target deceleration, then step S9 is executed. If, on the other hand, it is determined that the current deceleration 303 is not the target deceleration, the process returns to step S7. Because the current deceleration 303 does not reach the target deceleration until time T1 in FIG. 10, the braking force 302 increases at a predetermined gradient in step S7 until then.

Then in step S9, the target deceleration is obtained again, as shown in FIG. 1B. The control circuit 130 obtains the target deceleration referencing the target deceleration map (FIG. 5), just as in step S3. The target deceleration is set based on the relative vehicle speed and the vehicle-to-vehicle distance, as described above. Because the relative vehicle speed and the vehicle-to-vehicle distance change when the deceleration control (i.e., both the shift control and the brake control) starts, the target deceleration is obtained in real time according to that change.

When the target deceleration is obtained in real time in step S9, the braking force 302 is applied to the vehicle such that the current deceleration 303 matches the target deceleration by the brake control that is continuing from when it was started in step S7 (see steps S7 and S8).

The operation to obtain the target deceleration in step S9 continues to be performed until the brake control ends in step S11. The brake control continues (steps S10 and S11) until the current deceleration 303 matches the speed target deceleration, as will be described later. Because the current deceleration 303 is controlled to match the target deceleration (steps S7 and S8), as described above, the operation to obtain the target deceleration in step S9 continues until the obtained target deceleration matches the speed target deceleration.

At the time that step S9 is executed, the vehicle speed of the host vehicle is less, by the amount that the deceleration control has already been performed, than it was at the time that step S3 was performed before the start of the deceleration control. From this, the target deceleration obtained in order to achieve the target vehicle-to-vehicle distance and relative vehicle speed usually becomes, in step S9, a value smaller than the maximum target deceleration obtained in step S3.

From time T1 to time T7 in FIG. 10, the operation of obtaining the target deceleration in real time and applying the braking force 302 such that the current deceleration 303 matches that target deceleration is repeated. During that time, however, as a result of the brake control being continued, the target deceleration repeatedly obtained in step S9 gradually decreases. In response to this decrease in the value of the target deceleration, the braking force 302 applied by the brake control also gradually decreases, such that the current deceleration 303 gradually decreases while substantially matching that target deceleration. After step S9, step S10 is executed.

In step S10, the control circuit 130 determines whether the current deceleration 303 matches the speed target deceleration. If it is determined that the current deceleration 303 matches the speed target deceleration, the brake control ends (step S11) and this fact is transmitted to the brake control circuit 230 by the brake braking force signal SG1. If, on the other hand, the current deceleration 303 does not match the speed target deceleration, the brake control does not end. Since the current deceleration 303 matches the speed target deceleration at time T7 in FIG. 10, the braking force 302 applied to the vehicle becomes zero (i.e., brake control ends).

In step S12, the control circuit 130 determines whether the accelerator is on. If the accelerator is on, step S13 is executed. If not, step S16 is executed. In the example in FIG. 10, it is determined that the accelerator is on at time t8.

In step S13, a return timer is started. In the example in FIG. 10, the return timer starts from time T8. After step S13, step S14 is executed. The return timer (not shown) is provided in the CPU 131 of the control circuit 130.

In step S14, the control circuit 130 determines whether a count value of the return timer is equal to, or greater than, a predetermined value. If the count value is not equal to, nor greater than, the predetermined value, the process returns to step S12. If the count value is equal to, or greater than, the process proceeds on to step S15. In the example shown in FIG. 10, the count value becomes equal to, or greater than, the predetermined value at time T9.

In step S15, the control circuit 130 ends the shift control (downshift control) and returns the automatic transmission 10 to the speed determined based on the accelerator opening amount and the vehicle speed according to a normal shift map (shift line) stored beforehand in the ROM 133. In the example shown in FIG. 10, the shift control ends at time T9, at which time an upshift is executed. When step S15 is executed, the control flow ends.

In step S16, the control circuit 130 determines whether the vehicle-to-vehicle distance exceeds a predetermined value.

Step S16 corresponds to step S1. If it is determined that the vehicle-to-vehicle distance does exceed the predetermined value, step S15 is then executed. If it is determined that the vehicle-to-vehicle distance does not exceed the predetermined value, the process returns to step S12.

The foregoing exemplary embodiments enables the following effects to be achieved. According to this exemplary embodiment, the speed target deceleration is set so as to be between the current gear speed deceleration and the maximum target deceleration (step S4). That is, the deceleration produced by the engine braking force obtained from the downshift (shift control) into the selected gear speed is set so as to be between the engine braking force of the speed before the start of the deceleration control (i.e., the current gear speed deceleration) and the maximum target deceleration (step S4). As a result, even when deceleration control in which the brake control and shift control are performed simultaneously in cooperation with one another is executed (steps S6 and S7), the deceleration is not excessive so no sense of discomfort is imparted to the driver. In addition, even when the vehicle-to-vehicle distance and the relative vehicle speed have reached their respective target values and the brake control has ended (step S11), the engine brake from the downshift continues to be effective so hunting of the brake control due to an increase in vehicle speed (particularly when on a downward slope) following the end of the brake control (step S11) is able to be effectively suppressed.

Also according to this exemplary embodiment, from time T1 to time T7 in FIG. 10 after the current deceleration 303 matches the maximum target deceleration (step S8), the current deceleration 303 gradually decreases while substantially matching the target deceleration calculated in real time. Then at the point when the target deceleration (the same as the current deceleration 303 in this case) matches the speed target deceleration, the brake control ends, as shown in steps S10 and S11. That is, the brake control ends when the target deceleration calculated in real time matches the speed target deceleration (i.e., the deceleration after the downshift control). In other words, the brake control does not continue until the target deceleration (the current deceleration 303 in this case) returns to the deceleration that it was at time T0 when the deceleration control started (i.e., returns to the current gear speed deceleration).

If the deceleration control were to be performed by the brake control alone, i.e., without performing the shift control, it would be necessary to continue the brake control until the target deceleration returned to near the current gear speed deceleration and the target vehicle-to-vehicle distance and relative vehicle speed could be realized by the current gear speed deceleration alone. In contrast, because in this exemplary embodiment the shift control and the brake control are performed simultaneously in cooperation with one another, the brake control can be ended when the target deceleration substantially matches the deceleration achieved by the shift control (i.e., the speed target deceleration) and the target vehicle-to-vehicle distance and relative vehicle speed can be achieved by the deceleration achieved by the shift control alone. As a result, in this exemplary embodiment, the brake control can be ended in a shorter period of time, which ensures durability of the brakes (i.e., reduces brake fade and wear on the brake pads and discs.

Further in this exemplary embodiment, the brake control ends when the target deceleration (i.e., the current deceleration 303 in this case) matches the speed target deceleration (i.e., the deceleration after the downshift control), and deceleration control with only the shift control is performed from that point (steps S10 and S11; time T7 in FIG. 10). As a result, deceleration control is performed by only the shift control while the current deceleration 303 substantially matches the deceleration after the shift control (i.e., the deceleration produced by the engine braking force), which enables a smooth transition to the deceleration produced by the engine braking force.

As described above, the brake control ends when the target deceleration substantially matches the speed target deceleration (i.e., the deceleration produced by the engine braking force after the shift control). The shift control, on the other hand, ends either after a predetermined period of time has passed after the accelerator has been turned on (steps S12 and S13) after the brake control ends (step S11) or when the vehicle-to-vehicle distance exceeds a predetermined value after the brake control ends (step S16). In this way, by making the conditions for ending (i.e., returning from) the brake control different from those for ending (i.e., returning from) the shift control, the brake control can be ended in a short period of time, thus helping to ensure durability of the brakes. Also, since the shift control does not end unless the vehicle-to-vehicle distance exceeds the predetermined value, the engine brake continues to be effective.

Figure 11:
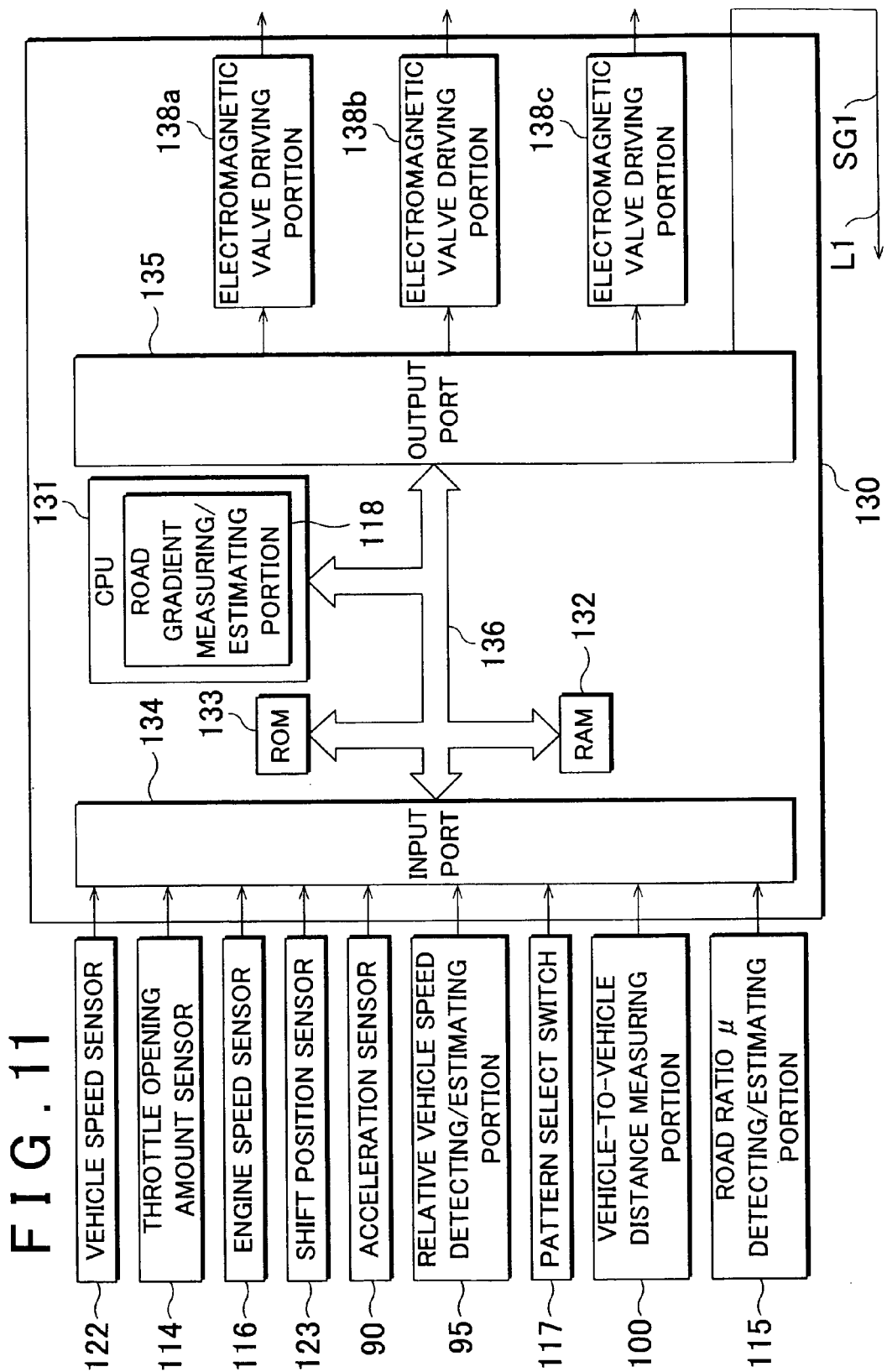
FIG. 11 is a block diagram schematically showing a control circuit of a deceleration control apparatus for a vehicle according to a second exemplary embodiment of the invention.

Next, a second exemplary embodiment of the invention will be described with reference to FIG. 11. Descriptions of parts in the second exemplary embodiment that are the same as those in the first exemplary embodiment will be omitted; only parts that are different will be described.

The second exemplary embodiment relates to the speed target deceleration of the first exemplary embodiment (step S4). In the second exemplary embodiment, the speed target deceleration is corrected according to the gradient of the road. FIG. 11 is a block diagram schematically showing the control circuit 130 according to the second exemplary embodiment. In the second exemplary embodiment, a road gradient measuring/estimating portion 118 is provided which measures or estimates the road gradient.

The road gradient measuring/estimating portion 118 can be provided as a portion of the CPU 131. The road gradient measuring/estimating portion 118 can measure or estimate the road gradient based on acceleration detected by the acceleration sensor 90. Further, the road gradient measuring/estimating portion 118 can store acceleration on a level road in the ROM 133 in advance, and obtain the road gradient by comparing that stored acceleration with the actual acceleration detected by the acceleration sensor 90.

In this exemplary embodiment, the speed target deceleration is corrected as follows. First, a gradient correction quantity (deceleration) is obtained. Here, it is obtained as a gradient 1%≈0.01 G (an upward gradient is positive and a downward gradient is negative).

Next, the speed target deceleration after the correction can be obtained from the following expression according to the third method for obtaining the speed target deceleration.

speed target deceleration=(maximum target deceleration−current gear speed deceleration)×coefficient+current gear speed deceleration+gradient correction quantity In the above expression, the coefficient is a value that is greater than 0 but equal to, or less than, 1.

Accordingly, on a downward gradient such as a downward slope, the speed target deceleration is corrected to a large value such that the gear speed to be selected, which is determined in step S4, is a lower gear speed than a gear speed selected when on a level road. On an upward gradient, the speed target deceleration is corrected to a small value such that the gear speed to be selected, which is determined in step S4, is a higher gear speed than a gear speed selected when on a level road.

According to the second exemplary embodiment, correcting the speed target deceleration according to the gradient of the road on which the vehicle is traveling enables optimum engine braking force to be obtained. As a result, an engine braking amount which matches that expected by the driver (i.e., required by the driver) is able to be obtained.

Figure 12:
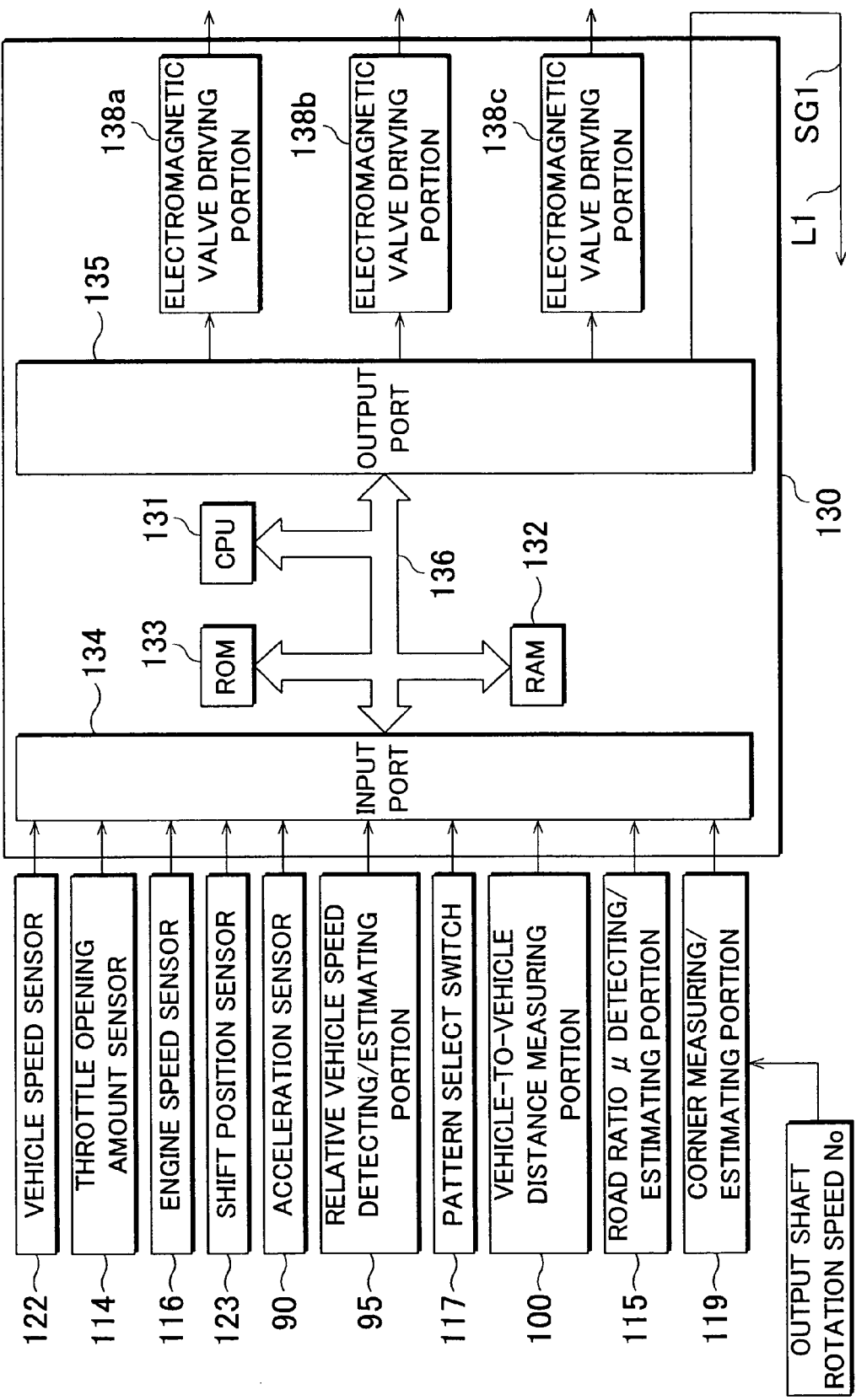
FIG. 12 is a block diagram schematically showing a control circuit of a deceleration control apparatus for a vehicle according to a third exemplary embodiment of the invention.

Next, a third exemplary embodiment of the invention will be described with reference to FIGS. 12 and 13. Descriptions of parts in the third exemplary embodiment that are the same as those in the foregoing exemplary embodiments will be omitted; only parts that are different will be described.

The third exemplary embodiment relates to the speed target deceleration (step S4) of the first exemplary embodiment, just like the second exemplary embodiment. The third exemplary embodiment corrects the speed target deceleration according to the shape of the road, such as the size (radius) of an upcoming corner, or any intersections or junctions that might be ahead. One example of a correction according to the size of a corner is as follows. FIG. 12 is a block view schematically showing peripheral components that are connected to the control circuit 130 according to the third exemplary embodiment. In the third exemplary embodiment, a corner measuring/estimating portion 119 which measures or estimates the size of a corner is connected to the control circuit 130.

The corner measuring/estimating portion 119 determines whether there is a corner ahead of the vehicle, and if so, measures or estimates the size of the corner. The determination and measurement or estimation are made based on, for example, information of the road shape obtained from a car navigation system mounted in the vehicle and an image captured by a camera mounted to the front of the vehicle. In the following example, the corner measuring/estimating portion 119 stores (in advance) the sizes of corners classified into one of three classifications (i.e., gentle, medium, hairpin) based on information indicating the size of the corner obtained by the car navigation system.

In this exemplary embodiment, the speed target deceleration is corrected as follows. First, a deceleration correction quantity (deceleration) for the corner is obtained. Here, a map such as that shown in FIG. 13, for example, which is stored in the corner measuring/estimating portion 119, may be used. Correction quantities for the deceleration are stored beforehand in the map. The correction quantities are based on the three different classifications of corner size and the rotation speed (No) of the output shaft 120c of the automatic transmission 10 corresponding to the vehicle speed.

For example, when a corner ahead of the vehicle is a medium corner and the current rotation speed of the output shaft 120c is 2000 [rpm], the deceleration correction quantity for that corner is obtained as 0.007 (G). The corner measuring/estimating portion 119 outputs data indicative of the deceleration correction quantity for that corner (hereinafter referred to as the "corner correction quantity") to the control circuit 130.

Next, the speed target deceleration after the correction can be obtained from the following expression according to the third method for obtaining the speed target deceleration.

speed target deceleration=(maximum target deceleration−current gear speed deceleration)×coefficient+current gear speed deceleration−corner correction quantity In the above expression, the coefficient is a value that is greater than 0 but equal to, or less than, 1.

Accordingly, on a sharp corner, the speed target deceleration is corrected to a considerably large value such that the gear speed to be selected, which is determined in step S4, becomes a much lower gear speed than a gear speed selected when on a straight road (i.e., not on a corner). On gentle curve, the amount of increase in the speed target deceleration is kept small compared to when on a sharp corner, such that the gear speed to be selected, which is determined in step S4, becomes a somewhat lower gear speed than a gear speed selected when on a straight road.

According to the third exemplary embodiment, correcting the speed target deceleration according to the shape, such as a corner, of the road on which the vehicle is traveling enables optimum engine braking force to be obtained. As a result, an engine braking amount which matches that expected by the driver (i.e., required by the driver) is able to be obtained.

Next, a fourth exemplary embodiment of the invention will be described with reference to FIG. 14. Descriptions of parts in the fourth exemplary embodiment that are the same as those in the foregoing exemplary embodiments will be omitted; only parts that are different will be described.

The fourth exemplary embodiment relates to the speed target deceleration (step S4) of the first exemplary embodiment, just like the second and third exemplary embodiments. The fourth exemplary embodiment corrects the speed target deceleration based on the slipperiness of the road surface, such as the road ratio $\mu$, of the road on which the vehicle is traveling. The fourth exemplary embodiment uses the detection or estimation results from the road ratio $\mu$ detecting/estimating portion 115 that detects or estimates the road ratio $\mu$.

The specific method for detecting or estimating the road ratio $\mu$ by the road ratio $\mu$ detecting/estimating portion 115 is not particularly limited, but can be any known method that is suitable. For example, other than the difference between the wheel speeds of the front and rear wheels, at least one of the change rate in the wheel speed, the operation history of ABS (antilock brake system), TRS (traction control system), or VSC (vehicle stability control), the acceleration of the vehicle, and navigation information can be used to detect/estimate the road ratio $\mu$. Here, navigation information includes information pertaining to the road surface (such as whether the road is paved or not) stored on a storage medium (such as DVD or HDD) beforehand, as with a car navigation system, as well as information (including traffic and weather information) obtained by the vehicle itself through communication (including vehicle-to-vehicle communication and roadside-to-vehicle communication) with vehicles that were actually traveling earlier, other vehicles, or a communication center. This communication also includes road traffic information communication system (VICS) and so-called Telematics.

In this exemplary embodiment, the speed target deceleration is corrected as follows. First, a road ratio $\mu$ correction quantity (deceleration) is obtained. Here, a map such as that shown in FIG. 14, for example, which is stored in the ROM 133, may be used. Correction quantities for the deceleration are stored beforehand in the map. These correction quantities are based on the road ratio $\mu$ and the rotation speed (No) of the output shaft 120c of the automatic transmission 10 corresponding to the vehicle speed. For example, when the road ratio $\mu$ is 0.5 and the current rotation speed of the output shaft 120c is 2000 [rpm], the deceleration correction quantity (road ratio $\mu$ correction quantity) for that road ratio $\mu$ is obtained as 0.003 (G).

Next, the speed target deceleration after the correction can be obtained from the following expression according to the third method for obtaining the speed target deceleration.

speed target deceleration=(maximum target deceleration−current gear speed deceleration)×coefficient+current gear speed deceleration+road ratio μ correction quantity In the above expression, the coefficient is a value that is greater than 0 but equal to, or less than, 1.

Accordingly, the speed target deceleration is corrected to a smaller value the lower the road ratio μ, such that the gear speed to be selected, which is determined in step S4, is a higher gear speed than a gear speed selected when the road ratio μ is high.

According to the fourth exemplary embodiment, correcting the speed target deceleration according to the slipperiness of the road surface, such as the road ratio μ, of the road on which the vehicle is traveling enables optimum engine braking force to be obtained. As a result, an engine braking amount which matches that expected by the driver (i.e., required by the driver) is able to be obtained.

In the foregoing description, the invention is described as applied to a stepped automatic transmission 10, but it may also be applied to a CVT (continuously variable transmission). In this case, the terms "gear speed" and "speed" may be replaced with the term "speed ratio", and the term "downshift" may be replaced with the term "CVT adjustment". Further, brake system is not limited to that described above, but may instead be a regenerative or other brake system as long as it applies braking force to the vehicle. Moreover, in the above description, the deceleration (G) is used as the deceleration indicative of the amount of deceleration of the vehicle. Alternatively, however, the control may be performed based on the deceleration torque.

While the invention has been described with reference to exemplary embodiments thereof, it is to be understood that the invention is not limited to the exemplary embodiments or constructions. T0 the contrary, the invention is intended to cover various modifications and equivalent arrangements. In addition, while various elements of the exemplary embodiments are shown in various combinations and configurations, which are exemplary, other combinations and configurations, including more, less or only a single element, are also within the spirit and scope of the invention.

What is claimed is:

1. A deceleration control apparatus for a vehicle, which performs deceleration control of the vehicle based on a distance between the vehicle and an obstacle ahead of the vehicle, comprising:
a controller which i) executes a deceleration applied by an operation of a brake system which applies a braking force to the vehicle and a shift operation which shifts the transmission of the vehicle into a lower speed than a current speed or a higher speed ratio than a current speed ratio; ii) obtains, based on the distance, a maximum target deceleration at which the vehicle is to be decelerated and a target deceleration at which the vehicle is to be decelerated after the deceleration control starts; iii) controls deceleration applied by the brake system in accordance with deceleration currently applied to the vehicle and the target deceleration; and iv) wherein the controller sets a speed or speed ratio of a transmission of the vehicle during the shift operation in accordance with a speed target deceleration, and wherein the speed target deceleration is between the maximum target deceleration and deceleration applied by the transmission at a gear speed set before the shift operation when the deceleration control starts.

2. The deceleration control apparatus for a vehicle according to claim 1, wherein the controller selects the speed or speed ratio taking into account the vehicle running environment which includes at least one of a road gradient, a road shape, and slipperiness of a road surface of a road on which the vehicle is traveling.

3. The deceleration control apparatus for a vehicle according to claim 1, wherein the controller ends the operation of the brake system based on an actual deceleration of the vehicle and the deceleration applied to the vehicle by the shift operation into the selected speed or speed ratio.

4. The deceleration control apparatus for a vehicle according to claim 1, wherein the controller ends the shift operation when an accelerator operation is performed or when the distance is equal to, or greater than, a predetermined value.

5. The deceleration control apparatus for a vehicle according to claim 1, wherein the controller i) obtains a speed target deceleration as a deceleration to be applied to the vehicle by the shift operation by referencing a map based on the time between the obstacle and the vehicle, which is calculated by dividing the obstacle-to-vehicle distance by the vehicle speed, and the relative speed between the obstacle and the vehicle, or by a calculation that uses the target deceleration, and ii) selects the speed or speed ratio based on the speed target deceleration.

6. The deceleration control apparatus for a vehicle according to claim 5, wherein the controller corrects the speed target deceleration according to at least one of a road gradient, a road shape, and slipperiness of a road surface.

7. The deceleration control apparatus according to claim 1, wherein:
the controller i) performs feedback control of the deceleration applied by the brake system after the deceleration control starts in accordance with a difference between the deceleration currently applied to the vehicle and the target deceleration so that the deceleration applied to the vehicle substantially matches the target deceleration, until the deceleration applied to the vehicle substantially reaches the maximum target deceleration, ii) controls deceleration applied by the brake system, and iii) updates the target deceleration in real time after the deceleration applied to the vehicle reaches the maximum target deceleration.

8. The deceleration control apparatus according to claim 1, wherein the speed target deceleration is constant.

9. The deceleration control apparatus according to claim 1, wherein in executing a deceleration control the controller controls deceleration during a first period of time to reach said maximum target deceleration, and after reaching said maximum target deceleration the controller controls deceleration during a second period of time according to the target deceleration, and further wherein after the second period of time the controller controls deceleration according to the speed target deceleration.

10. The deceleration control apparatus according to claim 9, wherein during at least a portion of the second period of time the target deceleration varies.

11. The deceleration control apparatus according to claim 10, wherein during the second period of time the target deceleration is between the maximum target deceleration and the speed target deceleration.

12. The deceleration control apparatus according to claim 11, wherein the speed target deceleration is constant.

13. The deceleration control apparatus according to claim 12, wherein the obstacle includes a preceding vehicle.

14. The deceleration control apparatus according to claim 1, wherein the obstacle includes a preceding vehicle.

15. A deceleration control method for a vehicle, by which deceleration control of the vehicle is performed based on a distance between the vehicle and an obstacle ahead of the vehicle, comprising the steps of:
   executing a deceleration to the vehicle by an operation of a brake system which applies a braking force to the vehicle and a shift operation which shifts the transmission of the vehicle into a lower speed than a current speed or a higher speed ratio than a current speed ratio;
   obtaining, based on the distance, a maximum target deceleration at which the vehicle is to be decelerated and a target deceleration at which the vehicle is to be decelerated after the deceleration control starts;
   controlling deceleration applied by the brake system in accordance with deceleration currently applied to the vehicle and the target deceleration;
   setting a speed or speed ratio of a transmission of the vehicle during the shift operation in accordance with a speed target deceleration, wherein the speed target deceleration is between the maximum target deceleration and deceleration applied by the transmission at a gear speed set before the shift operation when the deceleration control starts.

16. The deceleration control method for a vehicle according to claim 15, wherein the speed or speed ratio is selected taking into account the vehicle running environment which includes at least one of a road gradient, a road shape, and slipperiness of a road surface of a road on which the vehicle is traveling.

17. The deceleration control method for a vehicle according to claim 15, wherein the operation of the brake system is ended based on an actual deceleration of the vehicle and the deceleration applied to the vehicle by the shift operation into the selected speed or speed ratio.

18. The deceleration control method for a vehicle according to claim 15, wherein the shift operation is ended when an accelerator operation is performed or when the distance is equal to, or greater than, a predetermined value.

19. The deceleration control method for a vehicle according to claim 15, wherein i) a speed target deceleration is obtained as a deceleration to be applied to the vehicle by the shift operation by referencing a map based on the time between the obstacle and the vehicle, which is calculated by dividing the obstacle-to-vehicle distance by the vehicle speed, and the relative speed between the obstacle and the vehicle, or by a calculation that uses the target deceleration, and ii) the speed or speed ratio is selected based on the speed target deceleration.

20. The deceleration control method for a vehicle according to claim 19, wherein the speed target deceleration is corrected according to at least one of a road gradient, a road shape, and slipperiness of a road surface.

21. The deceleration control method according to claim 15, wherein the obstacle includes a preceding vehicle.

22. The deceleration control method according to claim 15, wherein the method includes controlling deceleration to reach the maximum target deceleration during a first period of time, and after reaching the maximum target deceleration controlling deceleration according to the target deceleration during a second period of time, and after the second period of time controlling deceleration according to the speed target deceleration.

23. The deceleration control method according to claim 22, wherein the target deceleration varies during at least a portion of the second period of time.

24. The deceleration control method according to claim 23, wherein the speed target deceleration is constant.

* * * * *